(12) United States Patent
Smyth et al.

(10) Patent No.: US 8,391,021 B2
(45) Date of Patent: Mar. 5, 2013

(54) PORTABLE ELECTRONIC APPARATUS CONNECTOR ASSEMBLY

(75) Inventors: Gregory Smyth, Toronto (CA); Benjamin James Cullen, London (GB); Edward Anthony Hackett, Tolworth Surbiton (GB)

(73) Assignee: Psion Inc., Mississauga, Ontario (CA)

( * ) Notice: Subject to any disclaimer, the term of this patent is extended or adjusted under 35 U.S.C. 154(b) by 363 days.

(21) Appl. No.: 12/766,441

(22) Filed: Apr. 23, 2010

(65) Prior Publication Data

US 2011/0261546 A1    Oct. 27, 2011

(51) Int. Cl.
*H05K 7/02*    (2006.01)
(52) U.S. Cl. .................... 361/807; 361/679.01; 361/803; 439/180

(58) Field of Classification Search .................. 361/807, 361/679.01, 748; 439/350
See application file for complete search history.

(56) References Cited

U.S. PATENT DOCUMENTS 7,442,060 B2 * 10/2008 Suwalski et al. ............. 439/180

* cited by examiner

*Primary Examiner* — Yuriy Semenenko
*Assistant Examiner* — Andargie M Aychillhum

(57) ABSTRACT

A portable electronic apparatus comprises a body having a surface with at least one open channel for receiving a connector assembly; an electrical interface on the body and configured to receive power and/or communicate data with an electrical interface of a compatible device; a connector assembly seated in the open channel and comprising at least one rail having a longitudinal member with a recess configured to engage a tooth of a locking arm of the compatible device; and a fastener removably fastening the rail to the body.

9 Claims, 13 Drawing Sheets

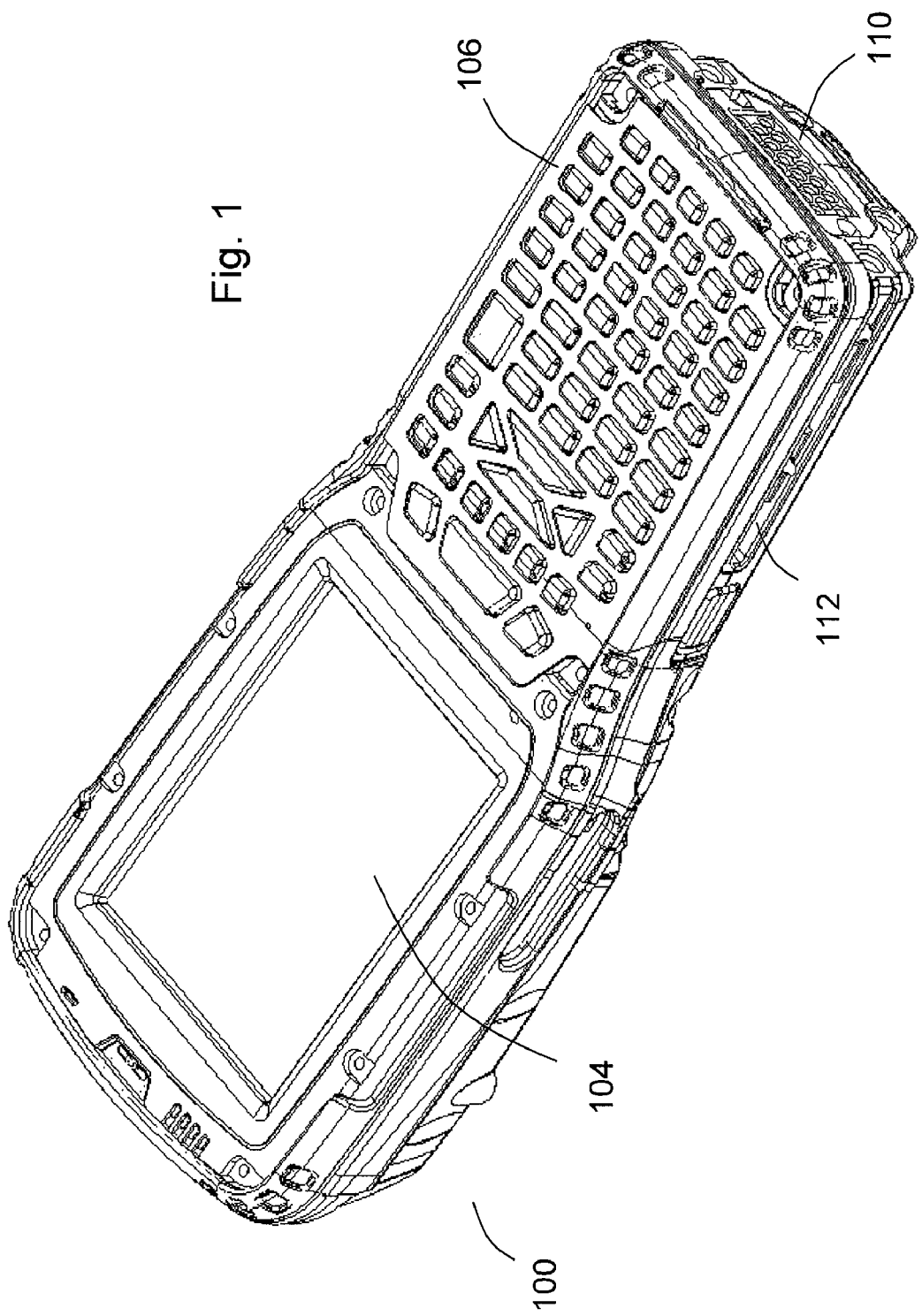

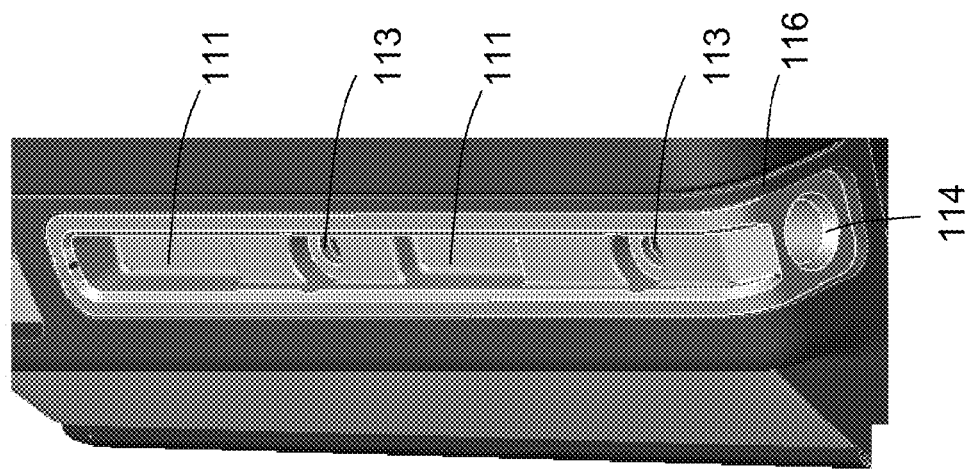
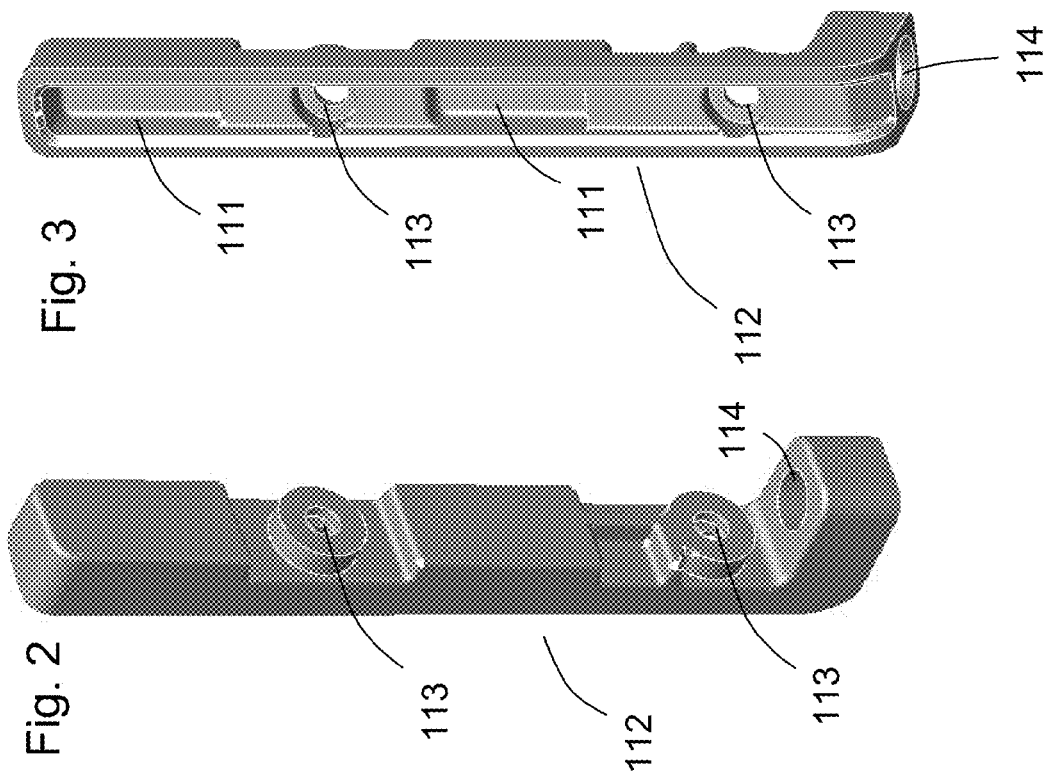

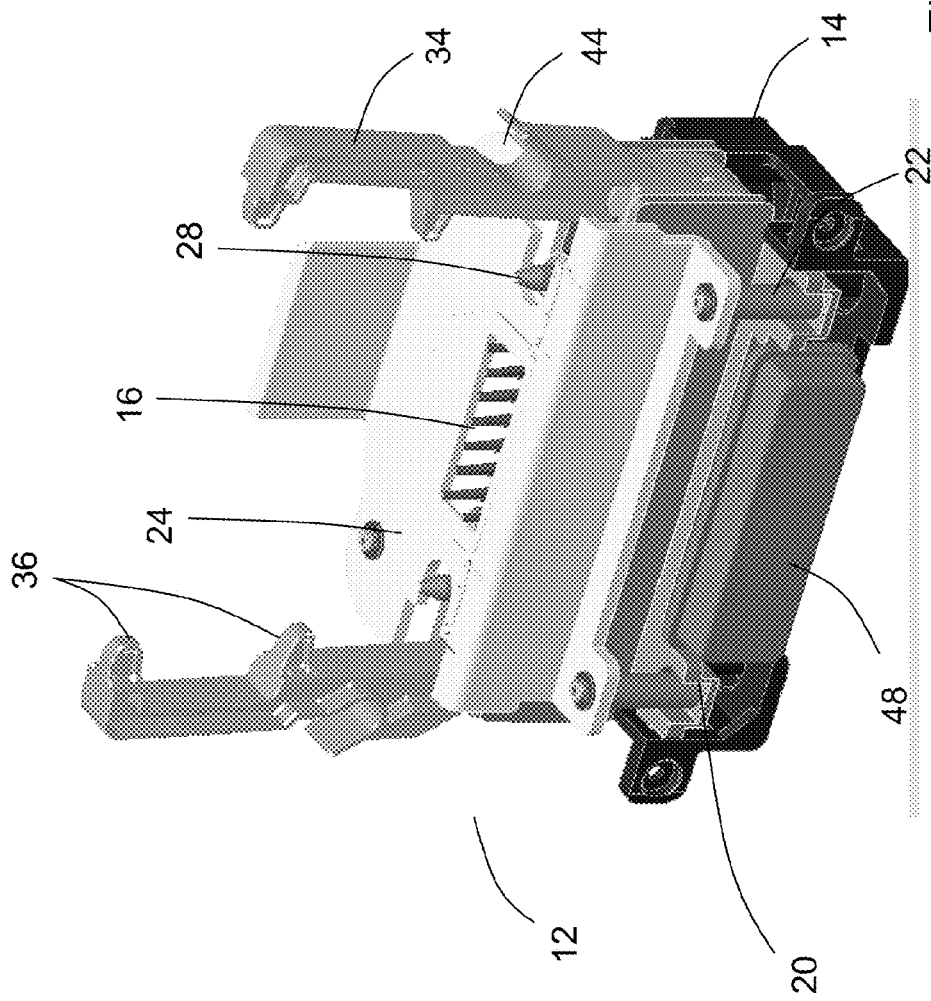

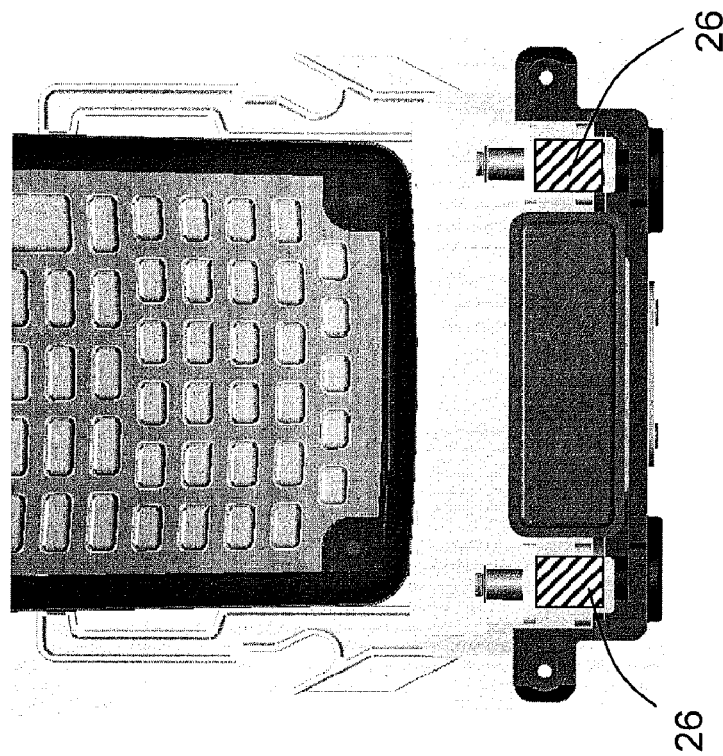
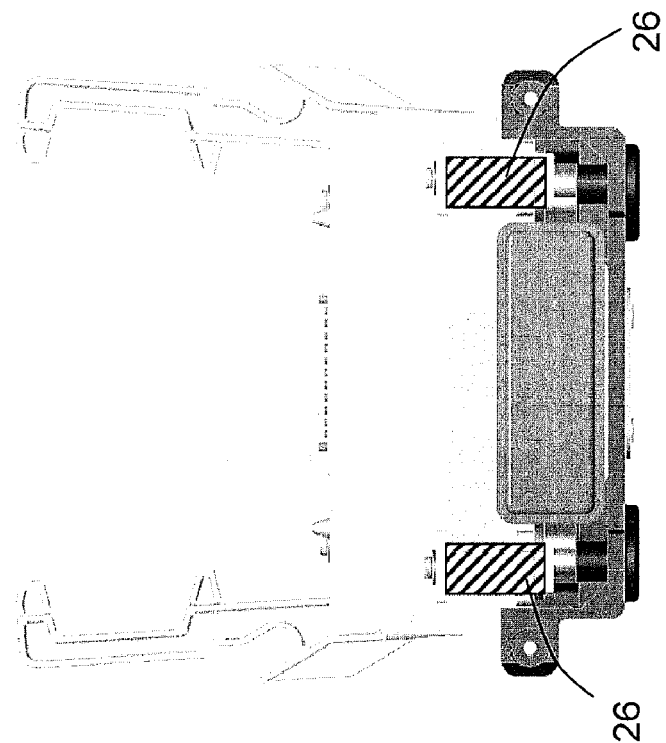

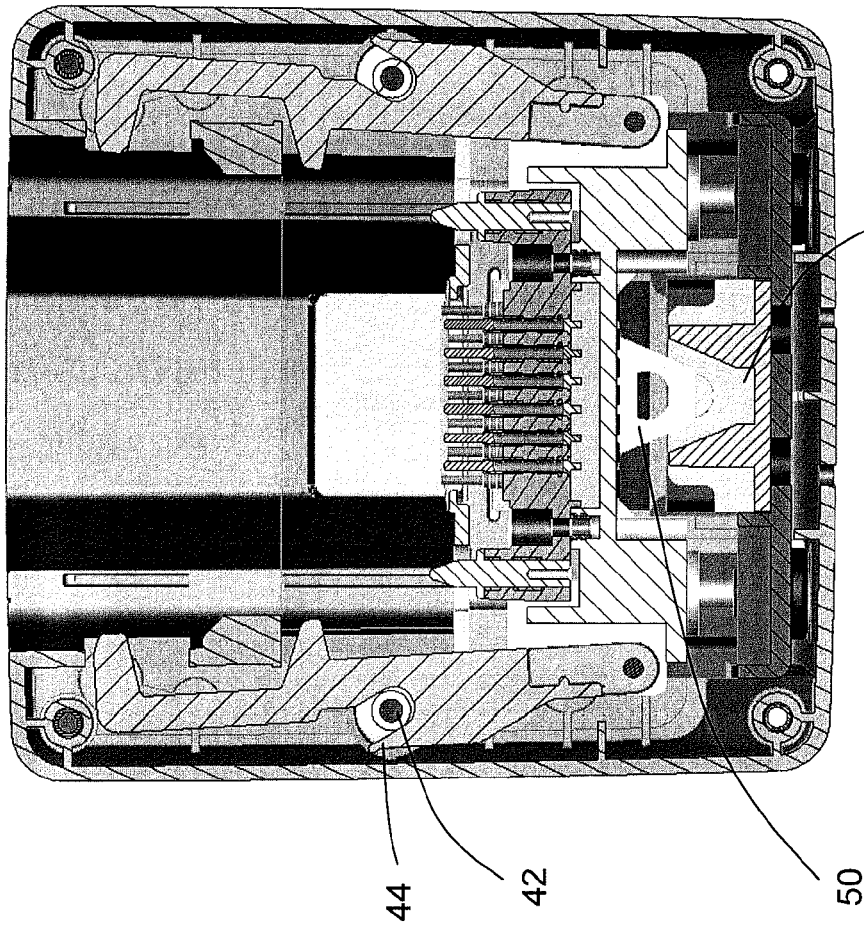
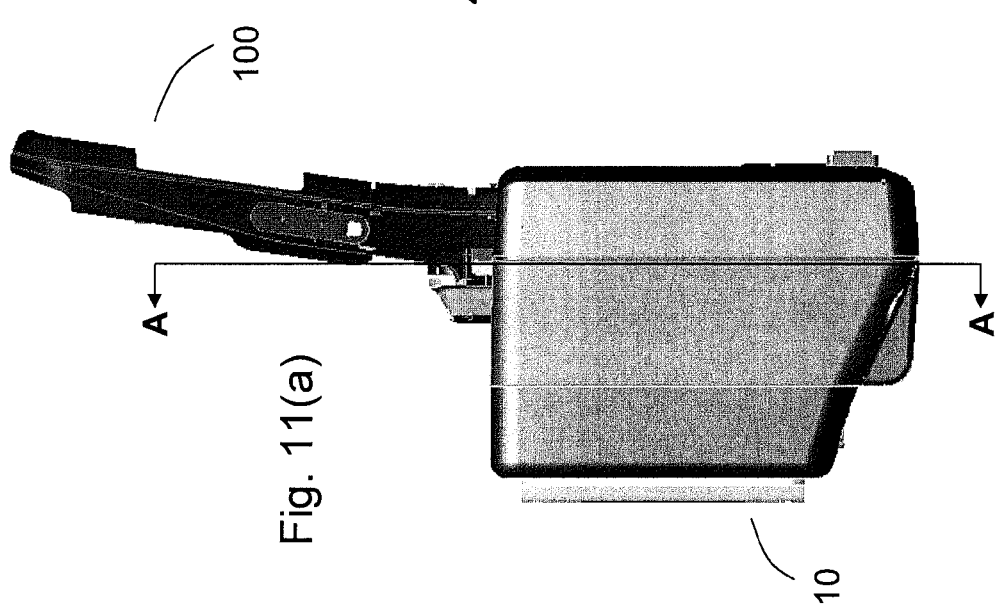

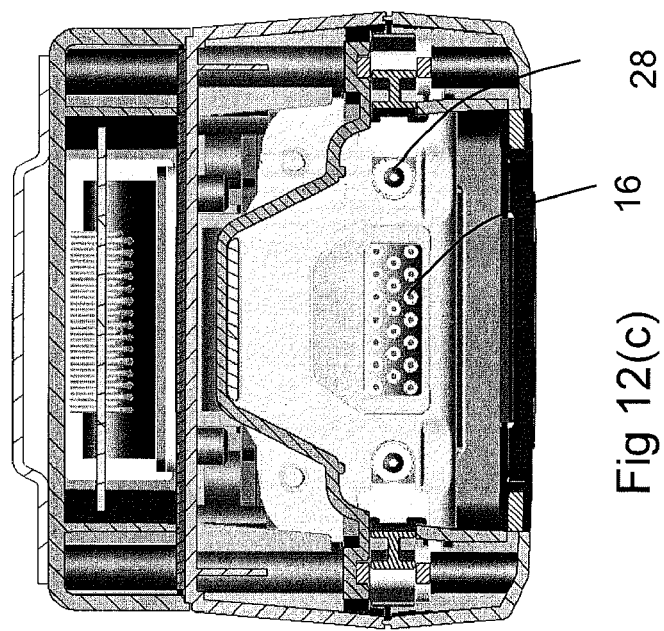
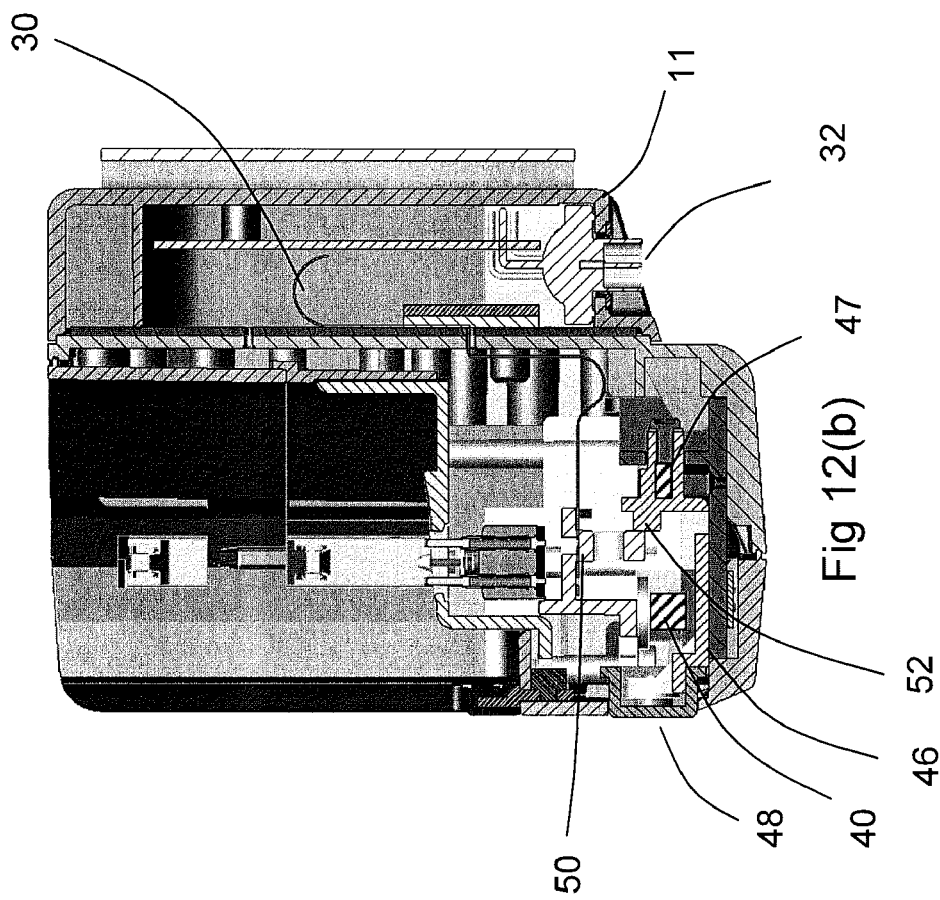

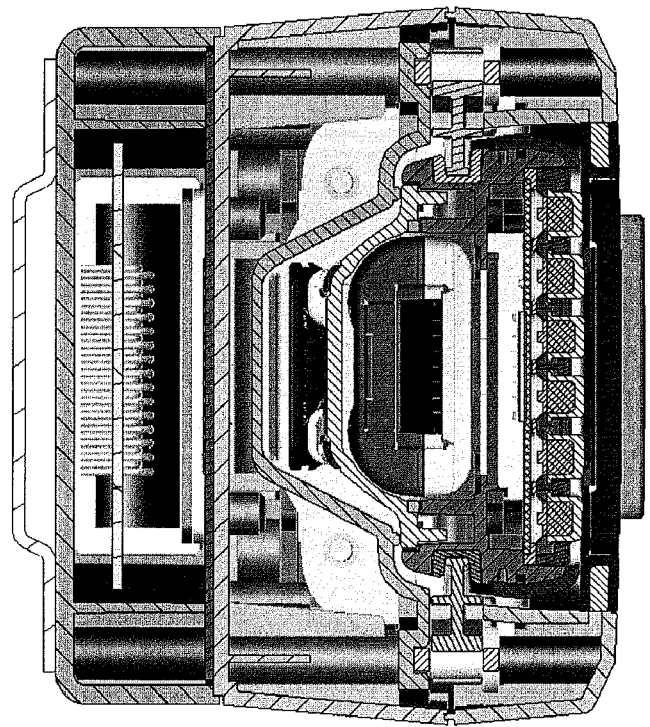
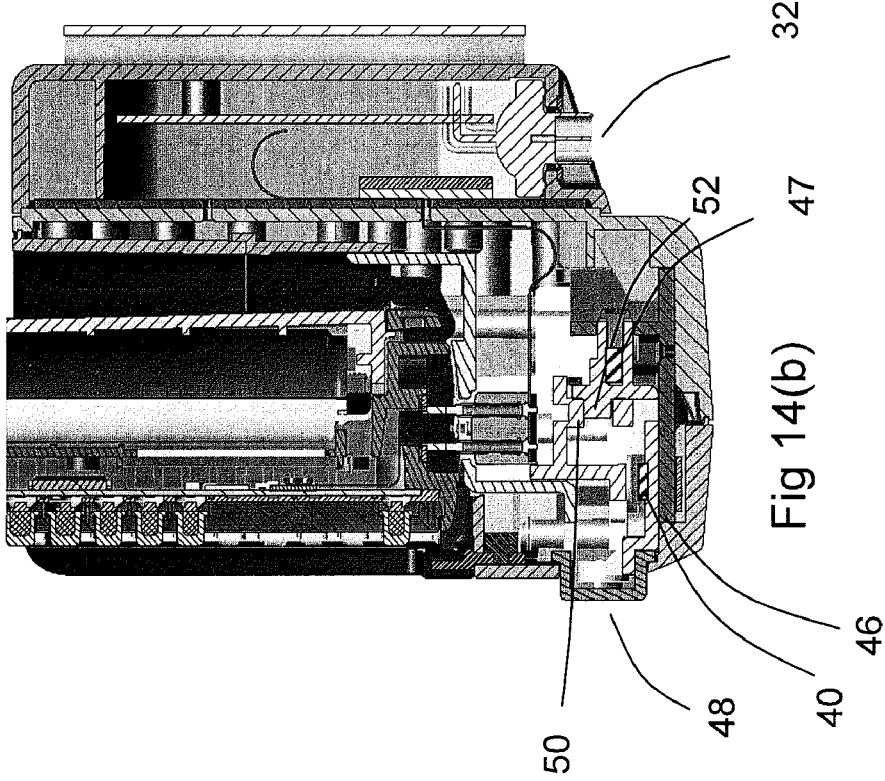
Fig 14(c)
Fig 14(b)

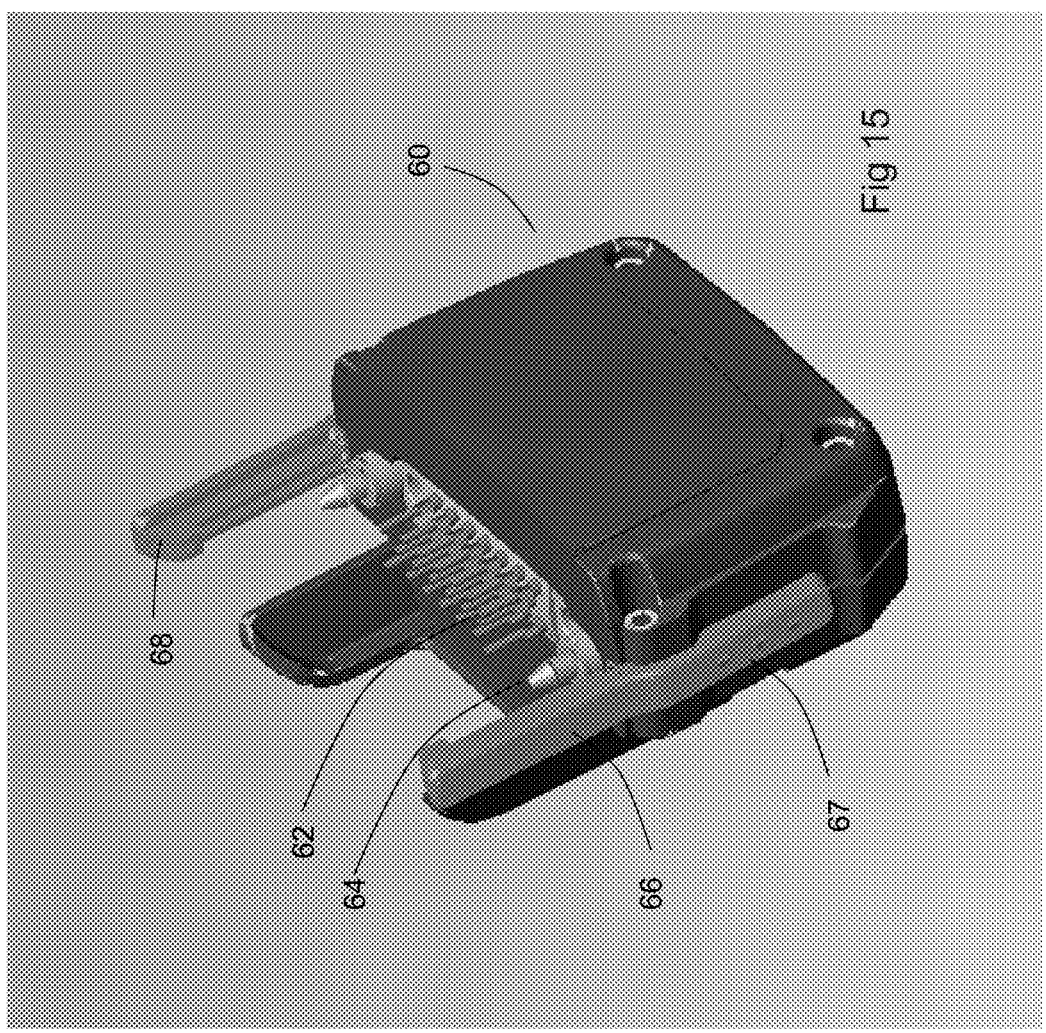

PORTABLE ELECTRONIC APPARATUS CONNECTOR ASSEMBLY

This invention relates generally to a portable electronic apparatus such as a mobile computer and in particular to a portable electronic apparatus having a connector assembly for connecting the portable electronic apparatus to a compatible device.

BACKGROUND

Portable electronic apparatus such as mobile computers or other handheld computing and communication devices have fragile electronic components such as circuit boards, processors, and liquid crystal display screens. While it is preferable to treat electronic devices with care, this is not possible when the electronic devices must be exposed to hostile environments or used in applications where rough treatment is unavoidable. For example, mobile computing devices are used at ports, warehouses, freezers, factories, delivery vans and airports—working all day in environments like these, mobile computing devices can get dropped, bumped, sprayed, chilled and generally abused.

There are a class of "rugged" portable electronic apparatus that are designed to withstand rough treatment and hostile environments. Some design approaches for a rugged electronic device include using fewer case pieces and reducing seams and seals to reduce penetration of water and dust, integrating antennas into the body of the device, increasing the space between internal components to improve shock and vibration resistance, placing display screens inside a thermoplastic elastomer boot to seal it to the device and to protect it from vibration and shock, and for devices which are operated in extremely cold conditions, including a heating element to minimize condensation. Of course, selecting durable materials also contribute to a more rugged device; the device casing can be made from an combination of ABS and polycarbonate that is resistant to stress cracking, and to surround the device with shock absorbent materials.

Such portable electronic apparatus typically have an electrical interface for receiving power from or exchanging data with a compatible device, such as a charging adapter or a docking cradle. When used in rugged applications it is particularly important that the compatible device be securely fastened to the portable electronic device so that the electrical interfaces of the portable electronic device and compatible device are in sustained and secure contact. Conventional means for connecting a device to a portable electronic device tend to establish a relatively weak physical connection, yet increasing the strength of the physical connection is often impractical because the body of the portable electronic device isn't strong or rigid enough to bear the stronger connection, or tends to wear out prematurely due to the stronger physical connection.

SUMMARY

According to one aspect of the invention, there is provided a portable electronic apparatus comprising: a body having a surface with at least one open channel for receiving a connector assembly; a user interface on the main body; circuitry in the body which is communicative with the user interface; an electrical interface on the body which is communicative with the circuitry and configured to receive power or communicate data or both with an electrical interface of a compatible device; a connector assembly seated in the open channel and comprising at least one rail having a longitudinal member with a recess configured to engage a tooth of a locking arm of the compatible device; and a fastener removably fastening the rail to the body. Each rail can comprise a pair of longitudinally spaced recesses in the longitudinal member.

The body can comprise a pair of surfaces each with an open channel, in which case there are a pair of rails each having a longitudinal member seatable in one of the open channels. More particularly, each open channel can extend along a respective side surface of the body and along a portion of a bottom surface of the body, in which case the pair of rails are each seated in a respective open channel and each have a longitudinal member and a lateral member extending from one end of the longitudinal member.

The lateral member of each rail can comprise an alignment pin borehole configured to engage an alignment pin of the compatible device when the electrical interfaces of the portable electronic apparatus and compatible device are in contact.

The fastener can be a screw and the longitudinal member and open channel each can further comprise a borehole. The boreholes are aligned when the rail is seated in the open channel and the screw is threadable through the boreholes thereby securing the rail to the body.

According to another aspect of the invention, there is provided a kit comprising the portable electronic apparatus described above; and a charging adapter comprising an electrical interface and at least one locking arm with a tooth configured to engage the recess of the rail such that the electrical interfaces of the charging adapter and the portable electronic apparatus are maintained in contact. The charging adapter can further comprise a pair of locking arms each with a tooth configured to engage the recess of a respective rail. The charging adapter can further comprise a pair of alignment pins that align with and engage the alignment pin boreholes of the connector assembly when the electrical interfaces of the portable electronic apparatus and the charging adapter are in contact.

According to yet another aspect of the invention, there is provided a kit comprising: a portable electronic apparatus as described above, and a docking cradle having an electrical interface and at least one locking arm with a pair of spaced teeth configured to engage the pair of recesses in the side rail such that the electrical interfaces of the docking cradle and the portable electronic apparatus are maintained in contact. The docking cradle can further comprise a pair of locking arms each with a pair of teeth configured to engage the pair of recesses of a respective rail. The docking cradle further comprises a pair of alignment pins that align with and engage the alignment pin boreholes of the connector assembly when the electrical interfaces of the portable electronic apparatus and the docking cradle are in contact.

BRIEF DESCRIPTION OF DRAWINGS

FIG. 1 is a front perspective views of a mobile computer having a connector assembly according to one embodiment of the invention.

FIGS. 2 and 3 are upper rear and lower front perspective views of a left side rail of the connector assembly, and FIG. 4 is a lower front perspective view of the left side rail seated in an open channel of the mobile computer.

FIG. 9 is a front perspective view of some docking components of the docking cradle.

FIG. 10 (a) is a front view of the docking components positioned in an unlocked position, and FIG. 10(b) is a front view of the mobile computer in a docked and connected position and the docking components in a locked position.

FIG. 11 (a) is a side elevation view of the docking cradle in an unlocked position and the mobile computer in a docked but unconnected position, and FIG. 11 (b) is a sectioned view of the docking cradle along section lines A-A.

FIG. 15 is a front perspective view of a charging adapter compatible with the mobile computer.

DETAILED DESCRIPTION OF EMBODIMENTS OF THE INVENTION

Figure 7:
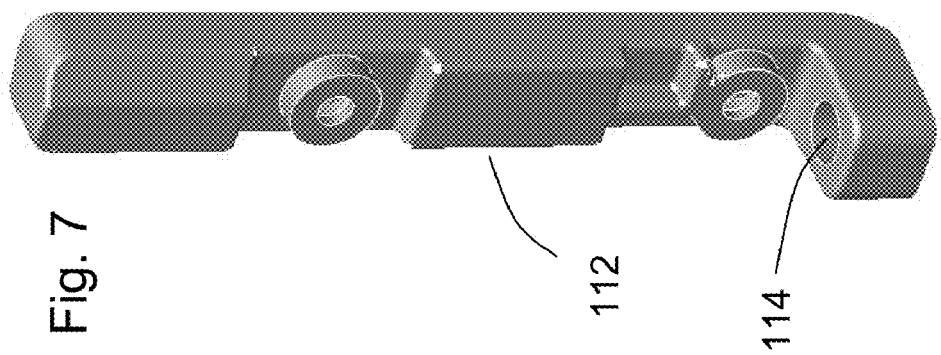
FIGS. 6 and 7 are upper rear and lower front perspective views of a right side rail of the connector assembly.
Figure 6:
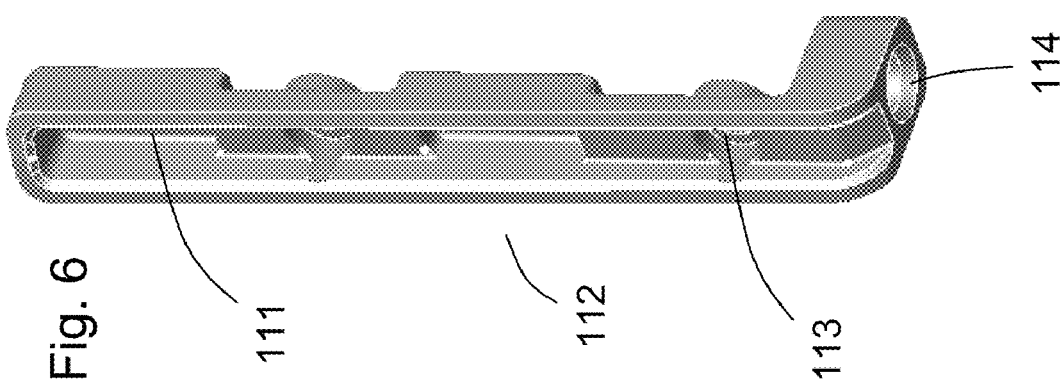
Figure 5:
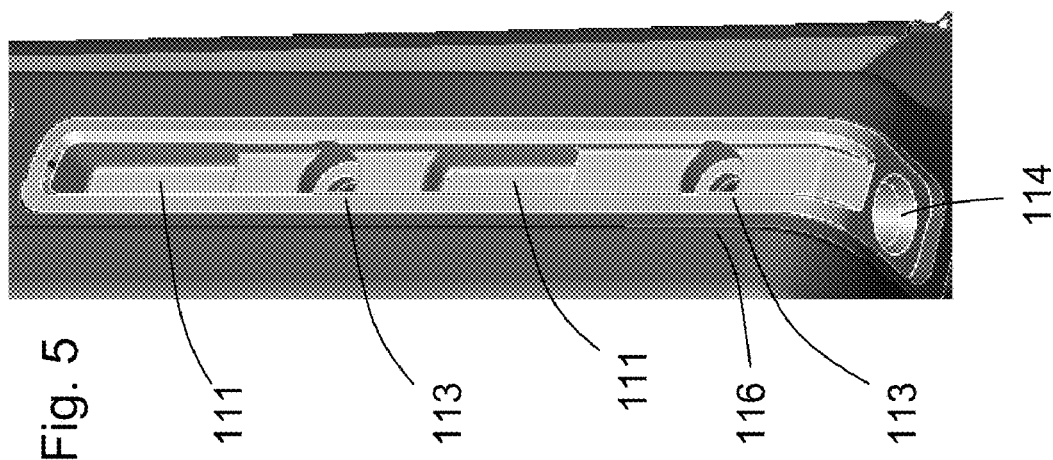
FIG. 5 is a lower front perspective view of the right side rail seated in an open channel of the mobile computer.

Directional terms such as "top", "bottom", and "upwards" are used in the following description for the purpose of providing relative reference only, and are not intended to suggest any limitations on how any apparatus is to be positioned during use, or to be mounted in an assembly or relative to an environment.

Mobile Computer

As shown in FIG. 1 and according to one embodiment, a mobile computer 100 (herein referred to variously and interchangeably as a portable electronic apparatus, handheld device, a handheld computer, or a mobile device) comprises a main body 102, a user interface comprising a display 104 and a keyboard 106, and an electrical interface 110 for receiving power from and exchanging data with a compatible device such as a docking cradle 10 as shown in FIGS. 8 to 14 or a charging adapter 60 as shown in FIG. 15. The electrical interface 110 is provided at the bottom of the mobile computer 100 for connecting to a corresponding interface of the docking cradle 10 or charging adapter 60. As shown in FIGS. 2 to 7, the mobile computer 100 has a connector assembly 112 in the form of a pair of side rails. These side rails 112 are located on each side of the mobile computer 100 and are each provided with a pair of recesses ("upper and lower recesses") 111 for engaging with securing means of compatible devices such as the docking cradle 10 and the charging adapter 60.

Additionally, in the present embodiment, the mobile computer 100 has the capability of wireless communicating data and/or voice, to and from servers as well as data acquisition sources within a communication network. Circuitry in the form of a circuit board (not shown) is housed within the mobile computer 100 and provides the electronic components required to implement at least a portion of the functionality provided by the mobile computer 100.

The circuit board includes a microprocessor (not shown), which controls general operation of the mobile computer 100. The microprocessor also interacts with functional device subsystems such as a communication subsystem, display module, a flash memory, random access memory (RAM), auxiliary input/output (I/O) subsystems, serial port, keyboard 106, speaker, microphone, short-range communications subsystem such as Bluetooth™ for example, and Universal Serial Bus (USB) expansion port for peripherals (all not shown). The mobile computer 100 may include a power source, such as a rechargeable battery which may also be removable and replaceable from the mobile computer. The mobile computer 100 may also include a positioning device (not shown), such as a GPS receiver for example, for receiving positioning information.

Operating system software used by the microprocessor may be stored in a persistent store such as the flash memory, which may alternatively be a read-only memory (ROM) or similar storage element (not shown). Those skilled in the art will appreciate that the operating system, specific device applications, or parts thereof, may be temporarily loaded into a volatile store such as RAM.

The microprocessor, in addition to its operating system functions, enables execution of software applications on the mobile computer 100. A predetermined set of applications, which control basic device operations, may be installed on the mobile computer 100 during its manufacture. These basic operations typically include data and voice communication applications, for example.

The display 104 is used to visually present an application's graphical user interface (GUI) to the user. Depending on the type of mobile computer 100, the user may have access to various types of input devices, such as, for example, a scroll wheel, trackball, light pen and/or a touch sensitive screen.

Referring particularly to FIGS. 2 to 7, the side rails 112 are made of a relatively durable material such as aluminium or another suitable metal and are removable from the mobile computer 100 and replaceable by new side rails when worn out. This is particularly advantageous when the main body 102 is made of a less durable material such as plastic; metallic side rails will tend resist wear better than a plastic main body, and can be easily replaced when worn out. Even if the side rails are made of the same material as the main body, it is advantageous to replace worn side rails with fresh side rails to prolong the useful life of the mobile computer 100.

Each side rail 112 is an L-shaped structure having a longer longitudinal member and a shorter lateral member connected to and extending 90 degrees from the longitudinal member. A pair of longitudinally spaced fastener boreholes ("upper and lower fastener boreholes") 113 extend through the longitudinal member and are designed to receive fasteners such as a pair of securing screws (not shown). The boreholes 113 has a stepped profile with a recessed annular ridge that receives the screw head such that the screw remains flush with the floor. The upper and lower recesses 111 are respectively located above and below the upper borehole 113, and are generally rectangular.

Each side rail 112 also has an alignment pin borehole 114 extending through its lateral member; this alignment pin borehole 114 serves to receive an alignment pin on the docking cradle 10 or the charging adapter 60 which serves to keep its electrical interface secured and/or aligned with the mobile computer electrical interface 110, as will be described in more detail below.

The mobile computer 100 is provided with a pair of L-shaped open channels 116 for receiving the pair of side rails 112. Each channel 116 has a longitudinal section that extends along each side of the mobile computer 100 to the bottom corner thereof, as well as a lateral section which extends from the bottom corner of the mobile computer 100 and inwards. Each channel 116 has a pair of longitudinally spaced and threaded boreholes that extend into the body of the mobile computer 110 housing and which align with the boreholes of the side rails 112 such that screws can thread through the side rails 112 and into the threaded boreholes thereby securing the side rails 112 in its respective channel.

While this embodiment of the mobile computer 100 features a pair of removable side rails 112, the mobile computer 100 according to another embodiment can have only one side rail 112 and one open channel on one side of the mobile computer 100; the other side of the mobile computer can have a recess formed directly onto the main body 102.

According to another embodiment, the side rails 112 lack the lateral member and instead comprises only the longitudinal member having a pair of recesses 111 and fastener boreholes 113. In this alternative embodiment, the pin boreholes 114 are formed directly into the bottom of the main body 102.

According to yet another embodiment, each side rail 112 only features a single recess 111; in such an alternative embodiment, the compatible charging adapter 60 or docking cradle 10 will feature securing means with only a single matching tooth.

Docking Cradle

Figure 8A:
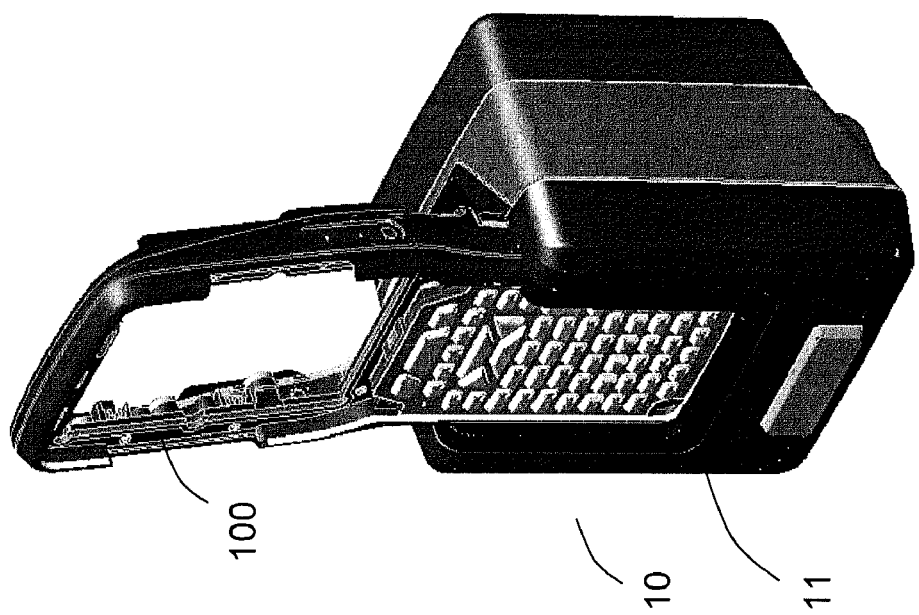
FIGS. 8(a) and (b) are respective front and rear perspective views of a docking cradle compatible with the mobile computer, and the mobile computer docked in the docking cradle.
Figure 8B:
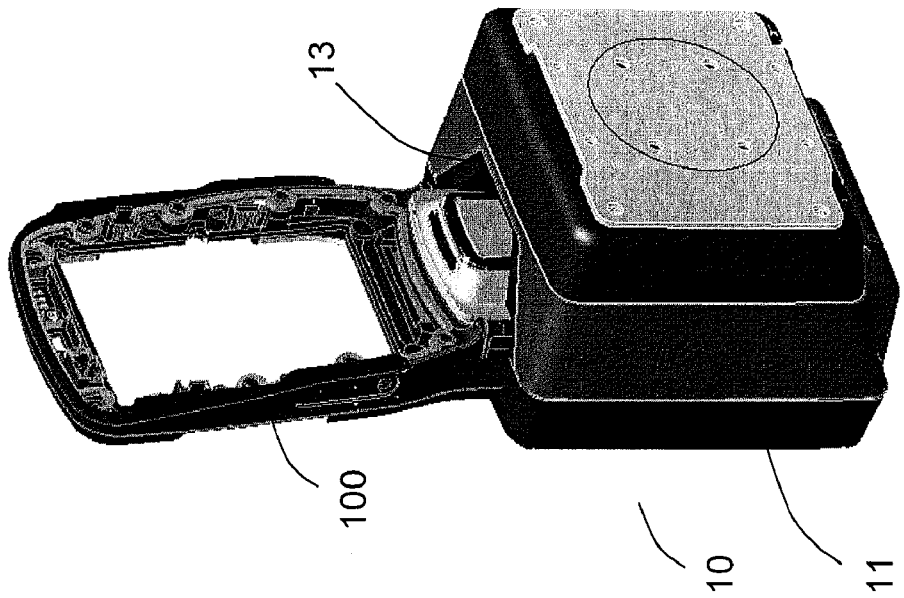

Referring now to FIGS. 8(a) and (b) and FIG. 9, the docking cradle 10 has a housing 11 which houses a floating connector assembly 12 and a base frame 14. The connector assembly 12 has a device securing mechanism for physically securing the mobile computer 100 in place and a docking cradle electrical interface 16 for supplying power to and being communicative with the mobile computer 100. The base frame 14 is fixed to the bottom of the housing 11. The connector assembly 12 is connected to the base frame 14 by springs such that the connector assembly 12 is movable within the housing 11 relative to the base frame 14 thereby isolating the mobile computer 100 docked in the connector assembly 12 from at least some shock, vibration or other motion encountered by the rest of the docking cradle 10.

The connector assembly 12 has a platform 20 from which four support plate guide posts 22 extend vertically upwards. A mobile computer support plate 24 extends parallel to and above the platform 20 and has four openings which each receive one guide post 22 such that the support plate 24 is movable vertically relative to the platform 20. A set of four support plate coil springs 26 (See FIG. 10(a)) are provided to bias the support plate 24 in an elevated position and allow the support plate 24 to move between the elevated position and a depressed position relative to the platform 20; each support plate coil spring 26 extends around each guide post 22 and between the platform 20 and the support plate 24. While four guide posts and associated coil springs are shown in this embodiment, a different number or type of springs 26 can be used to bias the support plate 24 against the platform 20, such as one or more leaf springs.

The support plate 24 has a central interface opening for providing access between the mobile computer electrical interface 110 and the docking cradle electrical interface 16. The docking cradle electrical interface 16 in this embodiment are a series of spring-loaded pogo pins arranged in a rectangular array and disposed centrally on the platform 20 in alignment with the central interface opening, as shown in detail in FIGS. 9 and 12(c). A pair of alignment pins 28 on either side of the pogo pins extend through the alignment pin boreholes 114 of the side rails 110 on the mobile computer 100, thereby serving to keep the mobile computer electrical interface 110 and docking cradle electrical interface 16 aligned.

Figure 12A:
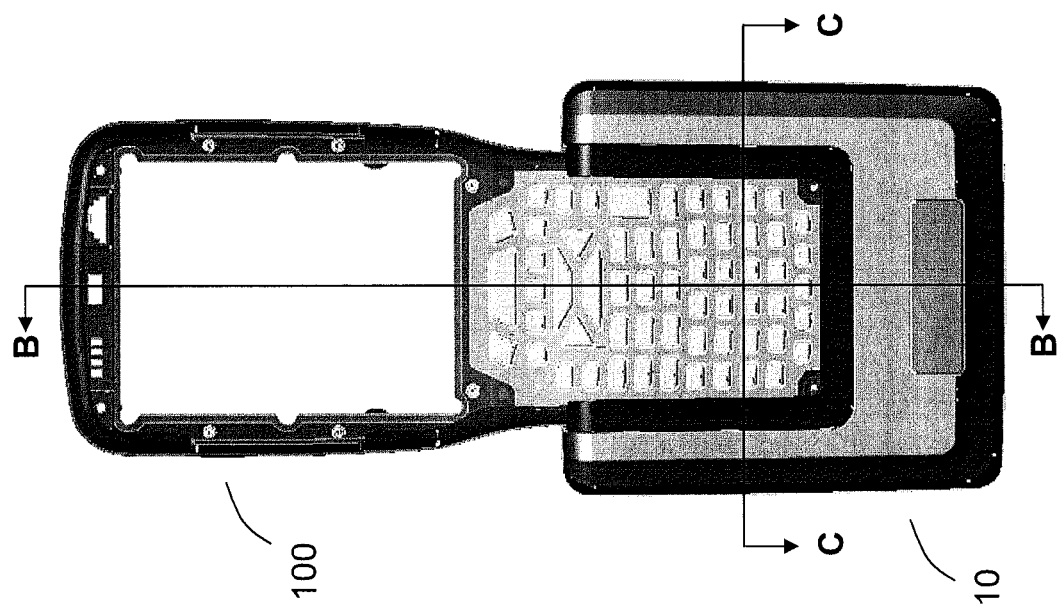
FIG. 12 (a) is a front view of the docking cradle in the unlocked position and the mobile computer in the docked but unconnected position, and FIGS. 12(b) and 12 (c) are respective sectioned views of the cradle along section lines B-B and C-C.

As shown in FIG. 12(b), a data cable 30 communicatively connects the docking cradle electrical interface 16 with a data port 32 on the bottom rear of the docking cradle housing 11. A communications cable (not shown) can be connected to this data port 32 and a power source (not shown) to provide power to the mobile computer 100 and/or to a computer (not shown) to transfer data to and from the mobile computer 100.

The device securing mechanism in this embodiment comprise the support plate 24 and a pair of locking arms 34 pivotally coupled to each side of the platform 20. The locking arms 34 extend longitudinally in a generally upward direction from the platform 20 and above the support plate 24. Each locking arm 34 has a pair of longitudinally-spaced locking teeth 36 which extending laterally inwards from the locking arm 34, and which engage a corresponding recess in the side rail 112 of the mobile computer 100. While two teeth 36 are shown for each arm 34 in this embodiment, a different number of teeth 36 and a corresponding number of recesses in the side 112 rail can be alternatively provided.

Figure 13B:
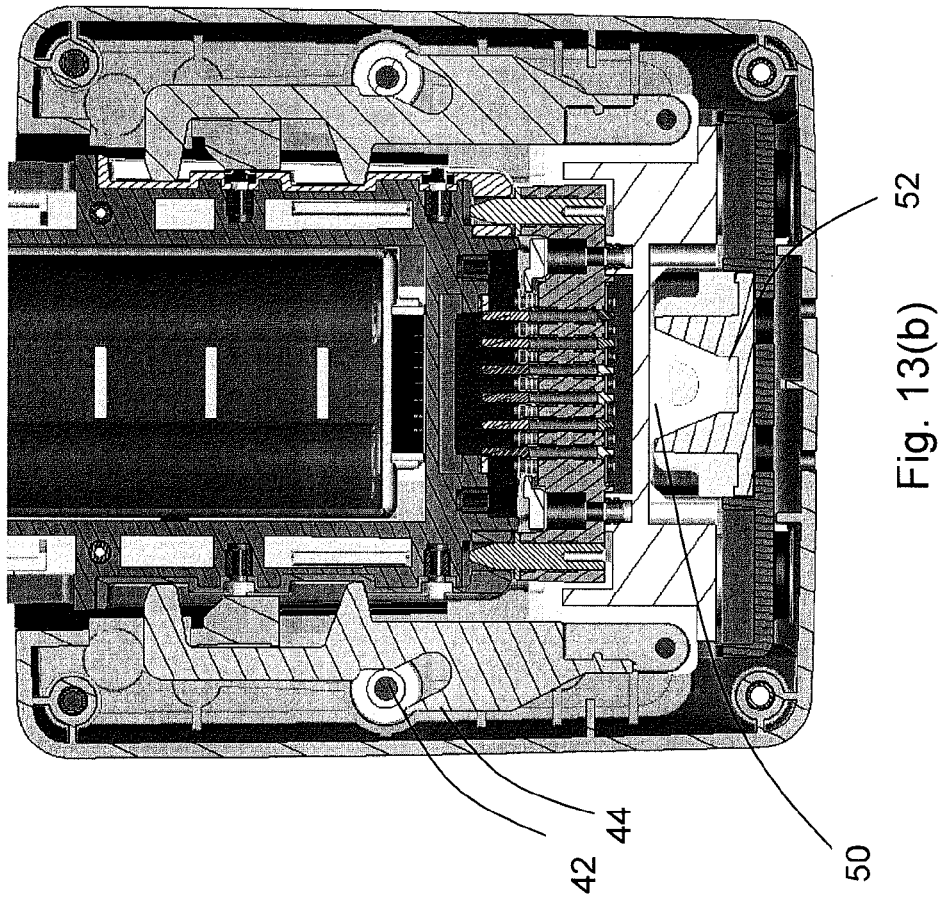
FIG. 13 (a) is a side elevation view of the docking cradle in a locked position and the mobile computer in a docked and connected position, and FIG. 13 (b) is a sectioned view of the docking cradle along section lines A-A.
Figure 13A:
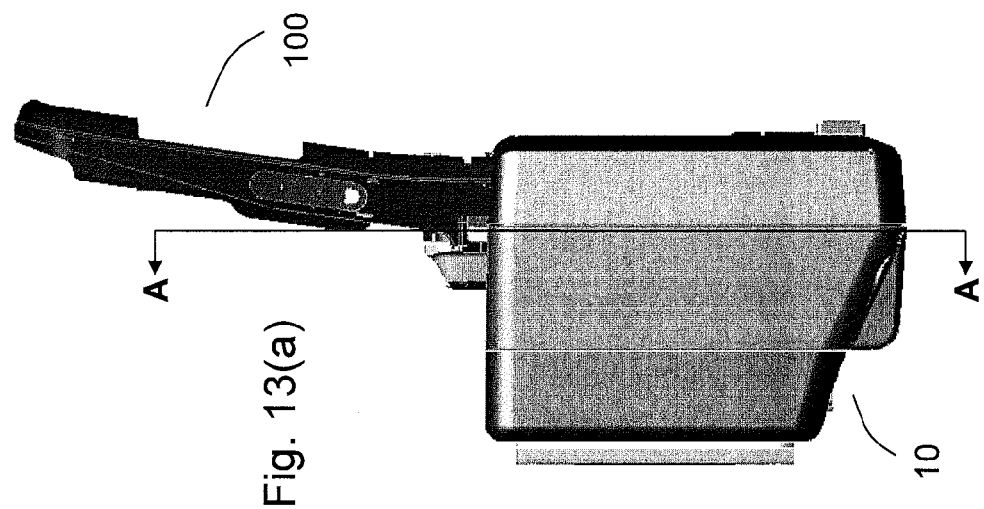

The housing 11 has a receptacle 13 which extends inwards from the top and side of the housing 11. The locking arms 34 are located at each side of the receptacle 13 and are pivotable between a locked and unlocked position. FIGS. 9 to 11 show the locking arms 34 in the unlocked position and FIGS. 12 and 13 show the locking arms 34 in a locked position and securing the mobile computer 100. When in the unlocked position, the locking arms 34 are pivoted laterally outwards enough (i.e. away from the receptacle 13) that the mobile device 100 can be inserted into the receptacle 13 and onto the support plate 24 located at the bottom of the receptacle 13. When in the locked position, the locking arms 34 are pivoted laterally inwards (i.e. towards the receptacle 13) that the locking teeth 36 securely engage the recesses of the side rails 112 of the mobile computer 100, thereby physically securing the mobile computer 100 in the connector assembly 12.

As shown in FIG. 12(b) the connector assembly 12 is vertically suspended on the base frame 14 by a set of four connector assembly coil springs 40 located between the bottom surface of the platform 20 and the top surface of the base frame 14. The connector assembly coil springs 40 enable the connector assembly 12 to move between an elevated position and a depressed position in the receptacle 13 and relative to the base frame 14, and which bias the connector assembly 12 in the elevated position. There is enough space within the housing 11 and enough compliance in the springs 40 that when the connector assembly 12 is in the depressed position it can move laterally (i.e. front and back and side to side) within the housing 11 and relative to the base frame 14. While four coil springs 40 are shown in this embodiment, a different number or type of springs 40 can be used to bias the connector assembly 12 against the base frame 14, such as one or more leaf springs A pair of cams 42 are mounted (or built in as part of the housing) inside the housing 11 with each cam 44 located on the outboard side of a respective locking arm 34. Each locking arm 34 has a cam guideway 44 which engages one respective cam 42 and which is positioned at an angle on the locking arm 34 such that when the connector assembly 12 is in its elevated position the cam 42 and cam guideway 44 guide the locking arm 34 into the unlocked position as shown in FIG. 11(b), and when the connector assembly 12 is in its depressed position the cam 42 and cam guideway 44 guide the locking arm 34 into the locked position as shown in FIG. 13(b).

The collective stiffness of the support plate coil springs 26 and connector assembly coil springs 40 are selected to support the weight of the mobile computer 100, i.e. when the mobile computer 100 is inserted into the receptacle 13 and placed onto the support plate 24, the support plate 24 and connector assembly 12 remain in their elevated positions. In this position ("unconnected unlocked position") the locking arms 34 remain in their unlocked position and the mobile computer electrical interface 110 and interface 16 are not in contact. This position can be useful to a user who simply wishes to store the mobile computer 100 in the docking cradle without charging the mobile computer 100 or initiating a data transfer.

The collective stiffness of the support plate coil springs 26 are selected to be less than the collective stiffness of the connector assembly coil springs 40 so that when the mobile computer 100 is inserted into the receptacle 13 and sufficient downwards force is exerted by the user, the cover plate 24 will depress relative to the platform 20 before the connector assembly 12 will depress relative to the base frame 14; this ensures that the pogo pins of the docking cradle electrical interface 16 extend through the connector opening when the support plate 24 is depressed and the mobile computer electrical interface 110 and docking cradle electrical interface 16 establish a firm connection before the locking arms 34 pivot inwards to clamp the mobile computer 100. To elaborate, when the user exerts enough downward force to overcome the stiffness of the support plate coil springs 26, the cover plate 24 and mobile computer 100 will move downwards in the receptacle 13 until the mobile computer electrical interface 110 contacts the pogo pins of the docking cradle electrical interface 16. The springs of each pogo pin ensures that there is a secure connection with the mobile computer electrical interface 110. This position is hereinafter referred to as the "intermediate position".

When the support plate 24 hits a hard stop on the connector assembly 12, the downwards force exerted by the user starts pushing directly on the connector assembly, thereby compressing the springs 40 directly and forcing the connector assembly 12 to move downwards. The connector assembly 12 and mobile computer 100 will move downwards in the receptacle 13 and the locking arms 34 will be guided by their respective cams 42 and pivot from their unlocked position to their locked position until the locking teeth 36 securely engages the side rails 110 of the mobile computer 112. This position is hereinafter referred to as the "connected locked position", and in this position the mobile computer electrical interface 110 and docking cradle electrical interface 16 are connected, and the locking arms securely fasten the mobile computer 100 to the connector assembly 12.

As can be seen in FIG. 13(b), the recesses in the side rails 110 are positioned on the mobile device 100 such that when the locking arms 34 clamp onto the mobile computer 100, the bottom locking tooth 36 of each locking arm 34 abuts against the bottom edge of the bottom recess in each side rail; this prevents the mobile computer from moving upwards relative to the connector assembly 12 when the locking arms 34 are in their locked position. As the support plate coil springs 26 are compressed in this position, the support plate 24 exerts upwards pressure against mobile computer 100 and causes the bottom edge of the bottom recess to abut against the bottom locking tooth 36 of each locking arm, thereby securing the mobile computer 100 to the connector assembly 12 in the vertical direction. The connector assembly 12 can be designed so that the support plate coil springs 26 are relatively highly compressed (e.g. at or above 80%) when the mobile computer 100 and connector assembly 12 are in the connected locked position; this reduces the ability of the mobile computer 100 to move vertically relative to the connector assembly 12 when in the connected locked position and thus results in the mobile computer 100 being relatively securely fastened to the connector assembly 12 in the vertical direction.

When locked by the locking arms 34, the mobile computer 100 is also relatively securely fastened to the connector assembly 12 in the lateral direction and is relatively resistant to tipping (i.e. yaw, pitch or roll) in the connector assembly 12. This is because when the connector assembly 12 is in the locked position, the cams 42 prevent the locking arms 34 from moving laterally outwards and thus there is continuous inwards pressure exerted by the locking teeth 36 against the side rails 112 of the mobile computer 100. Further, the longitudinally spaced pair of locking teeth 36 impede the mobile computer 100 from rolling and pitching, and the engagement of the teeth 36 against the recesses of the side rails 112 impede the mobile computer 100 from yawing.

Figure 14A:
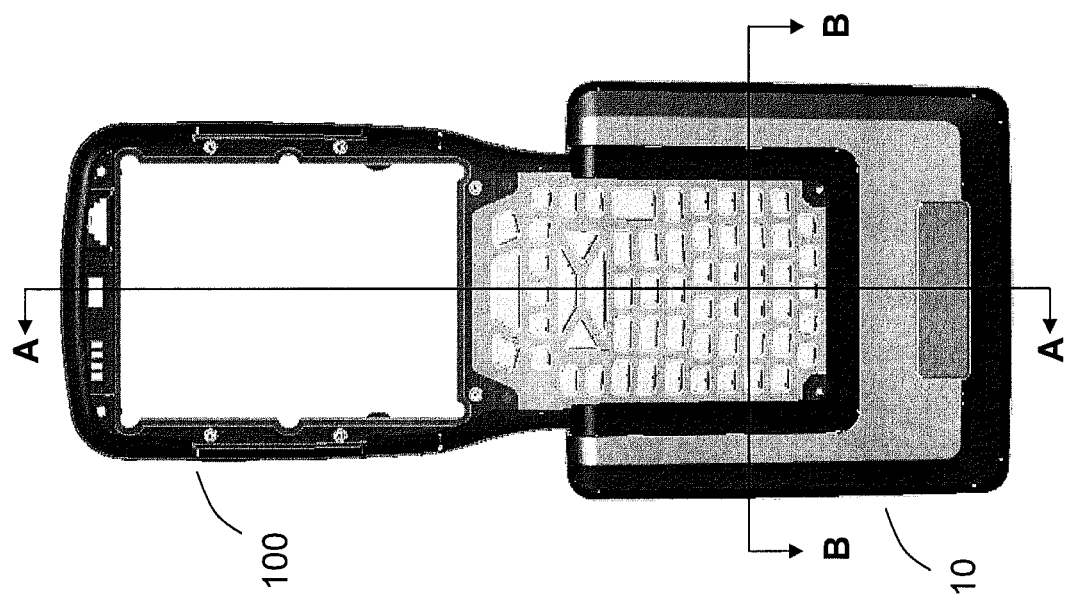
FIG. 14 (a) is a front view of the docking cradle in the locked position and the mobile computer in the docked and connected position, and FIGS. 14 (b) and 14 (c) are respective sectioned views of the cradle along section lines B-B and C-C.

Referring now to FIGS. 12(b) and 14(b), a connector assembly locking mechanism 46 is provided to maintain the connector assembly 12 in the connected locked position relative to the base frame 14, and to keep the mobile computer 100 locked and connected to the connector assembly 12. The locking mechanism 46 is located inside the housing 11 and is sandwiched between the connector assembly 12 and base frame 14. The locking mechanism is slidable fore and aft within the housing 11 between an extended and recessed position. A laterally disposed locking mechanism spring 47 is located between the locking mechanism 46 and a part of the base frame 14 and serves to bias the locking mechanism 46 towards its extended position, i.e. towards the front of the housing 11. A button opening is provided in the front of the housing 11 and is aligned with the locking mechanism 46. A push button 48 is connected to the locking mechanism 46 and partially extends through the button opening; the push button 48 has an annular lip inside the housing 11 and which is larger than the button opening thereby preventing the push button 48 from extending completely through the button opening. The push button 48 can be pushed to move the locking mechanism from its extended position to its recessed position. As the locking mechanism 46 is biased by the locking mechanism spring 47, releasing the push button 48 will cause the locking mechanism 46 to revert back to its extended position.

The bottom of a connector assembly 12 has an engagement bracket 50 which protrudes downwards and which is in contact with an engagement tab 52 laterally protruding on the locking mechanism 46. When the connector assembly 12 is in its elevated position as shown in FIG. 12(b), i.e. in the unconnected unlocked position and the locking mechanism 46 is in its recessed position, the engagement tab 52 contacts a frame of the engagement bracket 50; this contact prevents the locking mechanism spring 47 from moving the locking mechanism 46 to its extended position. When the connector assembly 12 is depressed into its connected locked position as shown in FIG. 14(b), the engagement bracket 50 also moves downwards and slides relative to the engagement tab 52 until an opening in the engagement bracket frame is aligned with the engagement tab 52. When this happens, the force of the locking mechanism spring 47 causes the engagement tab 52 to enter into the engagement bracket opening, thereby causing the engagement tab 52 and bracket 50 to engage and lock the connector assembly 12 from movement in the vertical direction, and causing the push button 48 outwards. In this state, the connector assembly 12 is in connected locked position, and the locking mechanism 46 is in its extended position. Pushing the push button 48 will cause the engagement tab 52 to become disengaged with the engagement bracket 50 thereby causing the connector assembly coil springs to move the connector assembly 12 back into its elevated position.

As discussed above, the locking mechanism 46 is constrained to move in fore-and-aft direction only; however, connector assembly 16 can roll and pitch relative to the locking assembly even when the engagement bracket 50 has engaged the tab 52. This is because the engagement bracket opening cross-section is larger than the tab cross-section and thus the engagement bracket 50 can move relative to the tab 52 even when the two are engaged. More particularly, the tab 52 in this embodiment has a half moon section shape, while the opening on the engagement bracket 50 has a full round section; this allows the connector assembly 16 and the attached mobile computer 100 to roll from side to side around the tab 52. The half-moon shape of the tab 52 in the full round engagement bracket opening also allows the connector assembly 16 to pitch front to back relative to the tab 52.

Therefore, when the connector assembly 12 is in its locked position, it is still free to roll and pitch relative to the base frame 14 and housing 11. This allows the mobile computer 100 docked in the connector assembly 12 to be at least partially isolated from the lateral component of any shock, vibration or other motion applied to the rest of the docking cradle 10. As the pogo pins of the docking cradle electrical interface 16 are spring loaded against the mobile computer electrical interface 110 and the mobile computer 100 is secured in the vertical direction in the docking cradle 10, the vertical component of any shock, vibration, or other motion should not affect the electrical connection between the mobile computer 100 and the docking cradle 10. Also, the multiple teeth 36 that securely clamp to the recessed side rails 112 also impede the mobile computer 100 from become dislodged from the docking cradle 10 by any shock, vibration or other motion.

Charging Adapter

Referring to FIG. 15, the charging adapter 60 has a power interface 62 for supplying power to the mobile computer 100 (hereinafter "charging adapter electrical interface"), and device securing mechanism 66 for physically securing the charging cradle electrical interface 62 to the mobile computer electrical interface 110. The device securing mechanism 66 comprises a pair of locking arms each having a tooth 68 for engaging the lower recess 111 of each side rail 112. A pair of securing pins 64 are provided on each side of the interface 62 and align with the alignment pin boreholes 114 of the side rails 112 when the mobile computer 100 and charging adapter 60 are connected.

While in this embodiment, the charging adapter 60 only supplies power to the mobile computer 100, other embodiments (not shown) can include a data communications means such as a USB or a DB9 serial interface for exchanging data with the mobile computer 100.

The locking arms are pivotably mounted to the sides of the charging adapter 60 and are movable between a locked position and an unlocked position. The device securing mechanism 66 also includes springs (not shown) which bias the locking arms into their locked position. The locking arms can be pivoted into their unlocked positions by pushing on a bottom section 67 of the locking arms and overcoming the spring force.

While exemplary embodiments of the invention have been illustrated and described, it will be appreciated that various changes can be made therein without departing from the scope and spirit of the invention.

What is claimed is:

1. A portable electronic apparatus comprising
   (a) a body having a pair of surfaces each with an open channel for receiving a connector assembly;
   (b) a user interface on the main body;
   (c) circuitry in the body and communicative with the user interface;
   (d) an electrical interface on the body and communicative with the circuitry and configured to receive power or communicate data or both with an electrical interface of a compatible device;
   (e) a connector assembly seated in the open channels and comprising a pair of rails, each rail having a longitudinal member in one of the open channels, each longitudinal member having at least one recess configured to engage a tooth of a locking arm of the compatible device; and
   (f) a fastener removably fastening the rail to the body; and wherein each open channel extends along a respective side surface of the body and along a portion of a bottom surface of the body, and the connector assembly comprises a pair of rails each seated in a respective open channel and each having a longitudinal member and a lateral member extending from one end of the longitudinal member.

2. A portable electronic apparatus as claimed in claim 1 wherein the lateral member of each rail comprises a alignment pin borehole configured to engage an alignment pin of the compatible device when the electrical interfaces of the portable electronic apparatus and compatible device are in contact.

3. A portable electronic apparatus as claimed in claim 1 wherein the fastener is a screw and the longitudinal member and open channel each further comprise a borehole, the boreholes being aligned when the rail is seated in the open channel and the screw is threadable through the boreholes thereby securing the rail to the body.

4. A kit comprising
   (a) a portable electronic apparatus as claimed in claim 1; and
   (b) a charging adapter comprising an electrical interface and at least one locking arm with a tooth configured to engage the recess of the rail such that the electrical interfaces of the charging adapter and the portable electronic apparatus are maintained in contact.

5. A kit as claimed in claim 4 further comprising the portable electronic apparatus as claimed in claim 1 and wherein the charging adapter further comprises a pair of locking arms each with a tooth configured to engage the recess of a respective rail.

6. A kit as claimed in claim 5 further comprising the portable electronic apparatus as claimed in claim 2 and wherein the charging adapter further comprises a pair of alignment pins that align with and engage the alignment pin boreholes of the connector assembly when the electrical interfaces of the portable electronic apparatus and the charging adapter are in contact.

7. A kit comprising
   (a) a portable electronic apparatus as claimed in claim 1, wherein one of the pair of rails comprises a pair of longitudinally spaced recesses in the longitudinal member; and
   (b) a docking cradle having an electrical interface and at least one locking arm with a pair of spaced teeth configured to engage the pair of recesses in one of the pair of side rails such that the electrical interfaces of the docking cradle and the portable electronic apparatus are maintained in contact.

8. A kit as claimed in claim 7 wherein both of the pair of rails comprises a pair of longitudinally spaced recesses in the longitudinal member and wherein the docking cradle further comprises a pair of locking arms each with a pair of teeth configured to engage the pair of recesses of a respective rail.

9. A kit as claimed in claim 8 further comprising the portable electronic apparatus as claimed in claim 2 and wherein the docking cradle further comprises a pair of alignment pins that align with and engage the alignment pin boreholes of the connector assembly when the electrical interfaces of the portable electronic apparatus and the docking cradle are in contact.

* * * * *

UNITED STATES PATENT AND TRADEMARK OFFICE
CERTIFICATE OF CORRECTION

PATENT NO. : 8,391,021 B2  
APPLICATION NO. : 12/766441  
DATED : March 5, 2013  
INVENTOR(S) : Smyth et al.

Page 1 of 1

It is certified that error appears in the above-identified patent and that said Letters Patent is hereby corrected as shown below:

In the Specification

In Column 1, Line 37, delete "an combination" and insert -- a combination --, therefor.

In Column 6, Line 56, delete "springs" and insert -- springs. --, therefor.

In the Claims

In Column 10, Line 23, in Claim 2, delete "comprises a" and insert -- comprises an --, therefor.

Signed and Sealed this  
Eighteenth Day of February, 2014

Michelle K. Lee  
*Deputy Director of the United States Patent and Trademark Office*